(12) United States Patent
Chu et al.

(10) Patent No.: US 11,850,645 B2
(45) Date of Patent: Dec. 26, 2023

(54) METHOD FOR PREPARING MULTILAYER METAL COMPOSITE PIPE

(71) Applicant: Taiyuan University of Science and Technology, Shanxi (CN)

(72) Inventors: Zhibing Chu, Shanxi (CN); Chun Xue, Shanxi (CN); Duo Zhang, Shanxi (CN); Dong Wei, Shanxi (CN); Qianhua Yang, Shanxi (CN); Cuirong Liu, Shanxi (CN); Yugui Li, Shanxi (CN)

(73) Assignee: Taiyuan University of Science and Technology, Shanxi (CN)

( * ) Notice: Subject to any disclaimer, the term of this patent is extended or adjusted under 35 U.S.C. 154(b) by 249 days.

(21) Appl. No.: 17/509,043

(22) Filed: Oct. 24, 2021

(65) Prior Publication Data

US 2022/0040745 A1    Feb. 10, 2022

Related U.S. Application Data

(63) Continuation of application No. PCT/CN2021/070205, filed on Jan. 5, 2021.

(30) Foreign Application Priority Data

Nov. 4, 2020 (CN) .......................... 202011217915.X

(51) Int. Cl.
*B21C 37/08* (2006.01)
*B21C 3/06* (2006.01)
(Continued)

(52) U.S. Cl.
CPC .............. *B21C 37/08* (2013.01); *B21B 25/00* (2013.01); *B21C 1/22* (2013.01); *B21C 3/06* (2013.01)

(58) Field of Classification Search
CPC ......... B21C 37/08; B21C 37/154; B21C 1/22; B21C 51/00; B21C 43/02; B21C 3/06;
(Continued)

(56) References Cited

U.S. PATENT DOCUMENTS

| 4,795,978 A * | 1/1989 | Zur ...................... G01R 33/561 |
| | | 324/309 |
| 7,596,848 B2 * | 10/2009 | Urech ................... B23P 11/005 |
| | | 29/516 |

* cited by examiner

*Primary Examiner* — David P Bryant
*Assistant Examiner* — Christine Bersabal

(57) ABSTRACT

A method for preparing a multilayer metal composite pipe includes steps of: internally and externally grinding blank pipes; cleaning oil stains; assembling a multilayer metal pipe; drawing to reduce a diameter; performing high-speed friction welding at the pipe ends; performing heat treatment; performing four-roller cross-rolling; straightening; performing two-roller cold-rolling; performing cold-drawing to reduce the diameter; performing cold-expansion to reduce the diameter; performing precise cold-rolling; degreasing; brightening; performing surface grinding; cleaning dust; detecting multilayer metal interface bonding; detecting flaws; testing metal structure performance; and sizing and packaging. By cycling the cold-drawing, the cold-expansion, and the precision cold-rolling, key indicators such as product dimensional accuracy, surface quality, material properties, and crystal grain size can be collaboratively controlled, so as to achieve higher accuracy, better performance, and more outstanding extreme specifications. The present invention solves the problem of inconsistent extension due to differences in metal properties.

11 Claims, 8 Drawing Sheets

(51) Int. Cl.
   *B21C 1/22*      (2006.01)
   *B21B 25/00*     (2006.01)
(58) Field of Classification Search
   CPC ........... B21B 25/00; B21B 19/02; B24B 5/12;
                B24B 5/04; B24B 5/10; B24B 5/40;
             B24B 27/033; G01N 2291/0231; B23K
                                          20/129
   See application file for complete search history.

METHOD FOR PREPARING MULTILAYER METAL COMPOSITE PIPE

CROSS REFERENCE OF RELATED APPLICATION

The application is a continuation application of a PCT application No. PCT/CN2021/070205, filed on Jan. 5, 2021; and claims the priority of Chinese Patent Application No. CN 202011217915.X, filed to the China National Intellectual Property Administration (CNIPA) on Nov. 4, 2020, the entire content of which is incorporated hereby by reference.

BACKGROUND OF THE PRESENT INVENTION

Field of Invention

The present invention relates to a technical field of metal pipe preparation, and more particularly to a method for preparing a multilayer metal composite pipe.

Description of Related Arts

Multilayer metal composite pipe, also known as layered composite pipe, is composed of two or more different metal pipes, wherein different pipe bodies are tightly integrated through various deformation and connection technologies. When an external force is applied, the layered pipes are deformed at the same time, and the interfaces thereof extend synchronously to ensure the uniformity of metal deformation. Generally, the base material of the multilayer metal composite pipe is used to bear forces, while the covering material is to meet the target requirements of corrosion resistance, wear-resistance, and radiation shielding Compared with single-metal pipe, the layered composite pipe combines respective advantages of different metals to save precious metals and reduce production costs while applying to harsh environments, which has a great potential for future applications.

Conventionally, the common compositing methods include explosive compositing, casting compositing, and mechanical compositing. The explosive compositing method melts the metals by the heat produced at the moment of the explosion of the explosive and connects the metals by the pressure produced at that moment so that contact surfaces of the metal materials are connected by liquid welding. However, the shape of the base material and the covering material formed by this method is difficult to control during the explosion, the quality is poor, and the yield is low. Furthermore, the impact at the moment of explosion is dangerous and noisy, leading to low environmental friendliness and harsh production site requirements. The casting compositing method injects different liquid metals in time-sharing, thereby providing a better metallurgical bonding layer at the liquid surface with a high degree of bonding. However, a large number of new phases and substances will appear at the interface, resulting in poor stability of the bonding interface, high production cost, and poor interface bonding uniformity. The mechanical compositing method injects high-pressure-state liquid into the pipe body, in such a manner that the layered metal pipe expands and undergoes plastic deformation. After unloading the pressure, the pipes can be bonded together due to the metal rebound. However, it is difficult to achieve metallurgical bonding between metals. Moreover, during long-term service, due to the release of residual stress, the bonding force between the pipes is weak, so it is easy to suffer gaps, interlayers, etc.

Therefore, in view of the current common production status, there is an urgent need for an efficient method for preparing multilayer metal composite pipes, which is cable of multilayer metallurgical compounding, while reducing production costs and improving production efficiency. The product performance and accuracy are high, thereby providing a production technology for the continuously large-scale preparation of composite pipes.

SUMMARY OF THE PRESENT INVENTION

To overcome the defects in the prior art, an object of the present invention is to provide a method for preparing a multilayer metal composite pipe.

Accordingly, to accomplish the above objects, the present invention provides:

A method for preparing a multilayer metal composite pipe, comprising steps of:
1) Externally grinding blank pipes: grinding external surfaces of metal blank pipes to eliminate oxide films on the external surfaces and spiral joints caused by a previous process;
2) Internally grinding the blank pipes: grinding internal surfaces of the metal blank pipes to eliminate oxide films on the internal surfaces and quality defects caused by the previous process and producing micro-grooves on the internal surfaces of the blank pipes; wherein no micro-groove is produced on an internal surface of an innermost pipe of the multilayer metal composite pipe;
3) Cleaning oil stains: cleaning the internal surfaces and the external surfaces of metal blank pipes ground in step 2 to remove grits, metal burrs, and the oil stains;
4) Assembling a multilayer metal pipe: assembling the metal blank pipes cleaned in step 3 with internal and external clearances to form a multilayer metal blank pipe;
5) Drawing to reduce a diameter: reducing the diameter of the multilayer metal blank pipe through a drawing die, and fully contacting adjacent pipe layers in the multilayer metal blank pipe to form an interference fit, thereby obtaining a layered composite pipe blank by drawing to reduce the diameter;
6) Performing high-speed friction welding at the pipe ends: fusing pipe end gaps of the layered composite pipe blank with a high-speed friction welding head, and sealing by welding to prevent internal and external surfaces of adjacent pipe layers of the layered composite pipe blank from oxidizing;
7) Performing multi-point friction welding on pipe surfaces: applying multiple sets of the high-speed friction welding heads on surfaces of the layered composite pipe blank with sealed pipe ends to fuse gaps between corresponding friction welding areas, thereby realizing the multi-point friction welding on the pipe surfaces of the layered composite pipe blank;
8) Overall heating: overall heating the layered composite pipe blank after friction welding;
9) Performing four-roller cross-rolling: processing the heated layered composite pipe blank with large deformation treatment through the four-roller cross-rolling so that the internal and external surfaces of the adjacent pipe layers are metallurgically composited;
10) Straightening: straightening the layered composite pipe blank after the four-roller cross-rolling to eliminate bending and flattening problems caused during cooling as well as to eliminate internal residual stress;

11) Performing two-roller cold-rolling: processing the straightened layered composite pipe blank with plastic deformation and crushing metal crystal grains through the two-roller cold-rolling, so as to obtain a layered composite pipe with a reduced diameter;

12) Degreasing: cleaning the rolled layered composite pipe to remove surface oil stains;

13) Brightening: brightening the degreased layered composite pipe to reduce oxide scales on a surface of the metal pipe;

14) Performing surface grinding: processing the brightened layered composite pipe with the surface grinding to eliminate surface oxide films and pipe surface quality problems caused by the previous steps, and then polishing;

15) Cleaning dust: cleaning internal and external surfaces of the polished layered composite pipe to remove surface grinding head grit and metal burrs;

16) Detecting multilayer metal interface bonding: performing ultrasonic detecting on the cleaned layered composite pipe to obtain metallurgical bonding information of the internal and external surfaces between adjacent pipe layers of the layered composite pipe, and discarding an unqualified layered composite pipe having unqualified metallurgical areas;

17) Detecting flaws: performing the ultrasonic detecting on the surfaces of the cleaned layered composite pipe to obtain crack defect information of the layered composite pipe after deformation and discarding the unqualified layered composite pipe;

18) Testing metal structure performance: sampling and testing the qualified layered composite pipe; analyzing mechanical properties, grain sizes, and corrosion resistances of each pipe layer, and evaluating metal pipe performance; for the layered composite pipe with unqualified metal structure performance, repeating the steps 11-18 until the qualified layered composite pipe is obtained; and 19) Sizing and packaging: sizing and packaging the qualified layered composite pipe to facilitate transportation and avoiding corrosion by harmful substances.

Preferably, when the layered composite pipe with the reduced diameter obtained through steps 1-11 fails specification and performance requirements, a step Z3 and a step Z4 are inserted after step 11 before performing the steps 12-19;

Z3) Performing heat treatment: performing the heat treatment on the layered composite pipe with the reduced diameter to eliminate residual stress and cause dynamic recrystallization of the metal crystal grains; and Z4) Performing precise cold-rolling: after the heat treatment, processing the layered composite pipe with small-deformation cold-rolling through a multi-roller cold-rolling technology, so as to cause further plastic deformation and crushing the metal crystal grains, thereby reducing the diameter and wall thickness of the composite pipe to obtain a precisely rolled layered composite pipe with finer grain size and a better metal pipe toughness; if the layered composite pipe obtained by the step Z4 still fails the specification and performance requirements, repeating the steps Z3 and Z4 in sequence for at least once until the layered composite pipe satisfies the specification and performance requirements; and then performing the steps 12-19.

Preferably, when the layered composite pipe with the reduced diameter obtained through the steps 1-11 fails specification and performance requirements, at least one of a step Z1 and a step Z2 is inserted after step 11 to reduce the diameter and a wall thickness, and then a step Z3 and a step Z4 are inserted before performing the steps 12-19;

Z1) Performing cold-drawing to reduce the diameter: processing the layered composite pipe with the drawing die to generate plastic deformation which mainly reduces the diameter and secondarily reduces the wall thickness, thereby obtaining the layered composite pipe whose diameter is reduced by the cold-drawing;

Z2) Performing cold-expansion to reduce the wall thickness and increase the diameter: processing the layered composite pipe with an expansion die to generate the plastic deformation which mainly reduces the wall thickness and secondarily increases the diameter, thereby obtaining the layered composite pipe whose diameter is changed by the cold-expansion;

After at least one of the steps Z1 and Z2 is performed, if the layered composite pipe obtained by the cold-drawing or the cold-expansion fails diameter and wall thickness reduction requirements, then repeating at least one of the steps Z1 and Z2 for at least once until the layered composite pipe satisfies the diameter and wall thickness reduction requirements, and then performing the steps Z3 and Z4;

Z3) Performing heat treatment: performing the heat treatment on the layered composite pipe with the reduced diameter to eliminate residual stress and cause dynamic recrystallization of the metal crystal grains; and Z4) Performing precise cold-rolling: after the heat treatment, processing the layered composite pipe with small-deformation cold-rolling through a multi-roller cold-rolling technology, so as to cause further plastic deformation and crushing the metal crystal grains, thereby reducing the diameter and the wall thickness of the composite pipe to obtain a precisely rolled layered composite pipe with finer grain size and a better metal pipe toughness;

If the layered composite pipe obtained by the step Z4 still fails specification and performance requirements, repeating the steps Z3 and Z4 in sequence for at least once until the layered composite pipe satisfies the specification and performance requirements; and then performing the steps 12-19;

If the layered composite pipe, which is obtained by repeating the steps Z3 and Z4 in sequence at least once, still fails the specification and performance requirements, then repeating the steps Z1-Z4 at least once until the layered composite pipe satisfies the specification and performance requirements.

Preferably, in step 1, externally grinding the blank pipes comprises a specific step of grinding the external surfaces of the metal blank pipes with a grinding wheel head, wherein the grinding wheel head comprises a large-grain coarse grinding wheel, a medium-grain emery cloth, and a fine-grain grinding wheel; the large-grain coarse grinding wheel is used to eliminate spiral joints on the surfaces of the blank pipes; the medium-grain emery cloth is used to grind burrs and metal granular substances left by the large-grain coarse grinding wheel, and the fine-grain grinding wheel is used to polish the surfaces of the blank pipes; a grinding thickness of the grinding wheel head is 0.1 mm-5 mm; a roundness error range of the layered composite pipe blank after grinding is 0 mm-0.05 mm; a hole diameter deviation is ±0.01 mm, and a surface finish satisfies a Ra0.2 standard;

When the blank pipes are used as outer pipes of the layered composite pipe, the large-grain coarse grinding wheel, the medium-grain emery cloth, and the fine-grain grinding wheel are all used for grinding; when the blank pipes are used as inner pipes of the layered composite pipe, only the large-grain coarse grinding wheel and the medium-grain emery cloth are used for grinding, in such a manner that a plurality of scratches are left on the surfaces of the blank pipes to facilitate interface bonding between the outer pipes and the inner pipes of the layered composite pipe in subsequent processing;

In step 2, internally grinding the blank pipes comprises a specific step of: grinding the internal surfaces of the metal blank pipes with a wire brush grinding head, wherein a grinding thickness is 0.1 mm-1 mm, and peaks and valleys of 0.1 mm are generated; a steel wire diameter of the wire brush grinding head is ≤0.1 mm;

In step 3, cleaning the oil stains comprises a specific step of: soaking the metal blank pipes in an alkaline cleaning solution to clean the internal surfaces and the external surfaces, thereby removing the grits, the metal burrs, and the oil stains; wherein the metal blank pipes are overturned 3-5 times in the alkaline cleaning solution, a soaking time is 5-10 minutes, and a pH value of the alkaline cleaning solution is 8-10.

Preferably, in step 4, assembling the multilayer metal pipe comprises a specific step of: processing the multilayer metal blank pipes treated in steps 1-3 with a layered composite pipe blank hydraulic pusher, thereby providing clearance fit and oppositely pushing adjacent pipes to form the multilayer metal blank pipe, wherein the clearances between the adjacent pipe layers are less than 0.5 mm;

In step 5, a taper angle of a necking core head die of the drawing die is 5°-15°, and a length of a core head sizing belt is 5%-20% of the diameter of the layered composite pipe; a single-pass diameter expansion capacity is 0%-10% of the diameter of the layered composite pipe, and a single-pass wall reduction is −10%-+15% of a wall thickness of the layered composite pipe; since there is a gap between the internal walls of the outer pipes and the external walls of the inner pipes of the multilayer metal pipe, in order to reasonably eliminate the gap and air in the gap, the diameter is reduced by drawing, so as to achieve a perfect fit between the internal and external walls;

In the step 6, performing the high-speed friction welding at the pipe ends comprises a specific step of: after drawing to reduce the diameter, arranging the high-speed friction welding head at both ends of the layered composite pipe blank to seal the pipe ends by welding; wherein the high-speed friction welding head rotates at a speed of 100 r/min-3000 r/min, and applies a pressure to the pipe ends of the layered composite pipe blank to increase a friction between the high-speed friction welding head and the pipe ends; the pressure applied to the pipe ends of the layered composite pipe blank is determined according to pipe specifications, which is 20 t-0.01 t; for the layered composite pipe after drawing to reduce the diameter, in order to completely eliminate oxidation of the internal walls of the outer pipes and the external walls of the inner pipes during subsequent heating process which hinders the metallurgical bonding of the surfaces, the high-speed friction welding head is applied at both pipe ends, which melts the pipe metal with a high temperature, and quickly fuses the gap at the pipe ends under an external force, which effectively isolates oxygen, and completely eliminates the oxidation of the pipe surfaces in the subsequent processing;

In the step 7, performing the multi-point friction welding on the pipe surfaces comprises a specific step of: after sealing the pipe ends, arranging multiple sets of the high-speed friction welding heads on the surfaces of the layered composite pipe blank to fuse the gaps between surface friction welding areas; wherein the high-speed friction welding heads rotate at the speed of 100 r/min-3000 r/min, and applies a pressure to an external surface of the layered composite pipe blank to increase a friction between the high-speed friction welding heads and the pipe surfaces; the pressure applied to the external surface of the layered composite pipe blank is determined according to the pipe specifications, which is 5 t-0.01 t; for the composite pipe with closed pipe ends after drawing to reduce the diameter, in order to completely eliminate uneven heating between the internal walls of the outer pipes and the inner pipes during the subsequent heating process, and to avoid bulging caused by uneven internal stress which will lower effect of the subsequent large-deformation four-roller cross-rolling, multiple sets of the high-speed friction welding heads are applied on the pipe surfaces, and a pressure is applied to increase the friction between the high-speed friction welding heads and the pipe surfaces, so that a high temperature is generated to cause high-temperature adhesion of the pipe metal; furthermore, under the external force, the gaps between the corresponding friction welding areas are quickly fused to realize multi-point bonding of the composite pipe blank.

Preferably, in step 8, overall heating comprises a specific step of: after friction welding, transporting the layered composite pipe blank into a heating furnace through a furnace bottom roller bed, wherein four sets of flame nozzles of the heating furnace are divided into an upper layer and a lower layer in the heating furnace; an optimal hot working temperature is determined according to a lowest material melting point of the layered composite pipe blank; during heating, a difference between an actual temperature and the optimal hot working temperature is ±10° C.;

In the step 9, performing the four-roller cross-rolling comprises a specific step of: processing the heated layered composite pipe blank with the large deformation treatment through the four-roller cross-rolling, wherein an upper roller and a lower roller for the four-roller cross-rolling are active rollers, while a left roller and a right roller are passive rollers; during rolling, the four rollers are in contact with the heated layered composite pipe blank, and a micro-tapered mandrel having a taper of 1:8-1:15 is arranged on the internal surface of the layered composite pipe blank, so as to ensure transverse extension and wall thickness deformation of the heated layered composite pipe blank, and to keep a large rolling force on a pipe wall during rolling; dynamic pressing is adopted during rolling to realize multi-pass rolling with small deformation; a single-pass deformation is 0-D*10%, a cumulative deformation is 85%, and a metallurgical composite rate between an internal wall of an outer pipe and an inner pipe of the layered composite pipe blank is no less than 95%; wherein D is an external diameter of the layered composite pipe blank; the large-deformation four-roller cross-rolling is used mainly to realize the complete metallurgical composite between the internal walls of the outer pipes and the external walls of the inner pipes; in order to ensure the transverse extension and the wall thickness deformation of the heated composite pipe, and to keep the large rolling force on the pipe wall during rolling, it is necessary to applied the micro-tapered mandrel to the internal surface of the composite pipe; being micro-tapered is mainly for smoothly removing the mandrel after hot rolling formation, wherein the taper should be 1:8-1:15; during the whole working process, the four rollers adopt dynamic pressing to realize the multi-pass rolling with the small deformation, which can effectively realize broad flow of the metal while avoiding metal siltation;

In the step 10, straightening comprises a specific step of: using multiple sets of upper straightening rollers and lower straightening rollers, which are arranged obliquely on the surfaces of the layered composite pipe blank, for straightening; wherein the layered composite pipe blank advances spirally during straightening to ensure all areas on the surfaces of the layered composite pipe blank are correspondingly straightened and deformed; for the composite pipe with the reduced diameter after the four-roller cross-rolling, due to relatively large deformation and inconsistent deformation characteristics of various metals, a large amount of internal stress and uneven distribution are bound to occur; bending and collapse will occur during cooling, while the internal residual stress is relatively large; therefore, it must be straightened.

Preferably, in step 11, performing the two-roller cold-rolling comprises a specific step of: placing the straightened layered composite pipe blank in a closed deformation hole for plastic deformation, wherein the closed deformation hole is formed by an upper roller and a lower roller both having a continuous tapered section hole, as well as by a set of mandrels with tapered surfaces; a maximum deformation is 80%; the metal crystal grains are crushed, and a crystal grain size grade is 4-7; during rolling; the upper and lower rollers translate horizontally while rotating oppositely, thereby pushing the layered composite pipe blank to extend in a longitudinal direction; at extreme positions of the upper and lower rollers, the mandrels rotate for pipe advancing; a rotation range of the mandrels is 0°-75°, and a pipe advancing volume per each pass is 0-5 mm; the layered composite pipe with the reduced diameter is obtained by the two-roller cold-rolling. For the layered composite pipe after straightening, in order to obtain a higher precision, better performance, and more complete specifications, the two-roller cold-rolling is performed.

Preferably, in the step Z1, a taper angle of a necking core head die of the drawing die is 5°-15°, and a length of a core head sizing belt is 5-20% of the diameter of the layered composite pipe; a single-pass diameter expansion capacity is 0%-10% of the diameter of the layered composite pipe, and a single-pass wall reduction is −10%-+15% of a wall thickness of the layered composite pipe; in order to obtain extreme specifications, the diameter and the wall thickness of the layered composite pipe after the two-roller cold-rolling need to be reduced; in view of pipe crystal grain size requirements, a drawing process is used to shrink holes;

In the step Z2, a taper angle of a core head die of the expansion die is 5°-15°, and a length of a core head sizing belt is 10 mm-300 mm; a single-pass diameter expansion capability is 0%-10% of the diameter of the layered composite pipe, and a single-pass wall reduction is 0%-15% of the wall thickness of the layered composite pipe;

In order to obtain the extreme specifications, the wall thickness reduction of the layered composite pipe after cold-drawing cannot meet production needs; in view of the pipe crystal grain size requirements, the cold expansion is performed to reduce the wall thickness and increase the diameter.

Preferably, in the step Z3, performing the heat treatment comprises a specific step of: transporting the layered composite pipe with the reduced diameter into a heat treatment furnace through a furnace bottom spinning roller bed, wherein two flame nozzles are arranged separately at a top layer of the heating treatment furnace; an optimal hot working temperature is determined according to a lowest material melting point of the layered composite pipe blank; during heating, a difference between an actual temperature and the optimal hot working temperature is ±10° C.;

For the layered composite pipe after the two-roller cold-rolling, the cold-drawing, the cold-expansion, and the precise rolling, due to the large deformation, a large amount of residual stress is generated, and a large number of crushed crystal grains are generated due to plastic deformation, which is easy to break the metal pipe; therefore, the heat treatment must be performed to eliminate the residual stress while allowing the metal crystal grains to dynamically recrystallize, thereby eliminating harmful intercrystallite phases;

In the step Z4, the precision cold-rolling adopts a multi-roller cold-rolling mill; the multi-roller cold-rolling mill comprises multiple rollers each having a hole, and a set of rolling mandrels with tapered surfaces; after the cold-drawing, the cold-expansion and the heat treatment, the layered composite pipe is placed in the rollers, and forms a closed deformation hole with the rolling mandrels; the layered composite pipe is plastically deformed in the closed deformation hole while the metal crystal grains of the layered composite pipe are crushed; during rolling, the rollers translate horizontally while rotate oppositely, thereby pushing the layered composite pipe to extend in a longitudinal direction; at extreme positions of the rollers, the rolling mandrels rotate for advancing the layered composite pipe; a rotation range of the rolling mandrels is 0°-60°, and a pipe advancing volume per each pass is 0-3 mm; after the multi-roller precision cold-rolling, a maximum deformation of the layered composite pipe is 20%, a metal pipe crystal grain size grade is 5-9, a wall thickness tolerance is ≤5%, an external diameter roundness error is 0 mm-0.05 mm, a wall thickness unevenness is ≤5%, and a straightness is ≤0.15 mm/m; a quantity of the rollers in the multi-roller cold-rolling mill is three, four, five or six;

For composite pipe after the heat treatment, in order to obtain higher precision, better performance, and more outstanding extreme specifications, the layered composite pipe is processed with the multi-roller cold-rolling to obtain finer crystal grain size, more comprehensive extreme specifications, better surface quality, and better metal pipe toughness.

Preferably, in step 12, degreasing comprises a specific step of: soaking the rolled layered composite pipe in an alkaline cleaning solution to clean the internal and external surfaces, thereby removing the oil stains; wherein the layered composite pipe is overturned 3-5 times in the alkaline cleaning solution, a soaking time is 5-10 minutes, and a pH value of the alkaline cleaning solution is 8-10;

In step 13, brightening comprises a specific step of: transporting the degreased layered composite pipe into a bright cleaning furnace through a furnace bottom conveyor belt, wherein four sets of bright furnace nozzles are divided into an upper layer and a lower layer in the bright cleaning furnace, so as to ensure uniform heating of the layered composite pipe; the bright cleaning furnace is connected to a hydrogen generating device which generates hydrogen, and the hydrogen undergoes combustion reaction with oxygen to provide heat energy for the bright cleaning furnace; after the two-roller cold-rolling, the cold-drawing, the cold-expansion, and the precise rolling, the layered composite pipe is very easy to be oxidized during rolling due to the large deformation, so brightening is necessary;

In step 14, performing the surface grinding comprises a specific step of: grinding the external surface of the layered composite pipe with a grinding wheel head, wherein the grinding wheel grinding head is a fine-grain grinding wheel for polishing the surfaces of the blank pipes, and a grinding thickness is 0.1 mm-5 mm;

In step 15, cleaning the dust comprises a specific step of: cleaning the internal and external surfaces of the layered composite pipe with a negative pressure cleaning device, thereby removing the surface grinding head grit and the metal burrs;

In step 16, detecting the multilayer metal interface bonding comprises a specific step of: performing the ultrasonic detecting on the cleaned layered composite pipe with an ultrasonic detection device, so as to comprehensively obtain the metallurgical bonding information of the internal and external surfaces between the adjacent pipe layers of the layered composite pipe;

In step 17, detecting the flaws comprises a specific step of: performing the ultrasonic detecting on the surfaces of the cleaned layered composite pipe with an eddy current flaw detection device, so as to comprehensively obtain the crack defect information of the layered composite pipe after deformation;

In step 18, testing the metal structure performance comprises a specific step of: sampling and testing the cleaned layered composite pipe through physical testing and chemical testing; analyzing the mechanical properties, the grain sizes, and the corrosion resistances of each pipe layer, and comprehensively evaluating the metal pipe performance.

According to the present invention, the method for preparing the multilayer metal composite pipe is suitable for preparing composite pipes with two or more layers of different metal pipes.

Compared with the prior art, the present invention has the following beneficial effects:
1. The method of the present invention can realize mass production of metal composite seamless pipes, and solves a problem of inconsistent extension due to differences in metal properties. While realizing multilayer metallurgical compositing between metals, the production cost is reduced, production efficiency is improved, and product performance and precision are higher.
2. The composite pipe produced by the present invention has a strong bonding ability and can greatly improve the bonding rate between multiple layers of dissimilar metals.
3. The steps of the method of the present invention can be flexibly selected according to customer needs to produce multi-variety and multi-specification composite pipes, so as to meet pipe specification and performance requirements under different working conditions; especially, by cycling the cold-drawing, the cold-expansion, the heat treatment, and the precision cold-rolling, products with higher precision, better performance, and more outstanding extreme specifications can be obtained.

Figure 1:
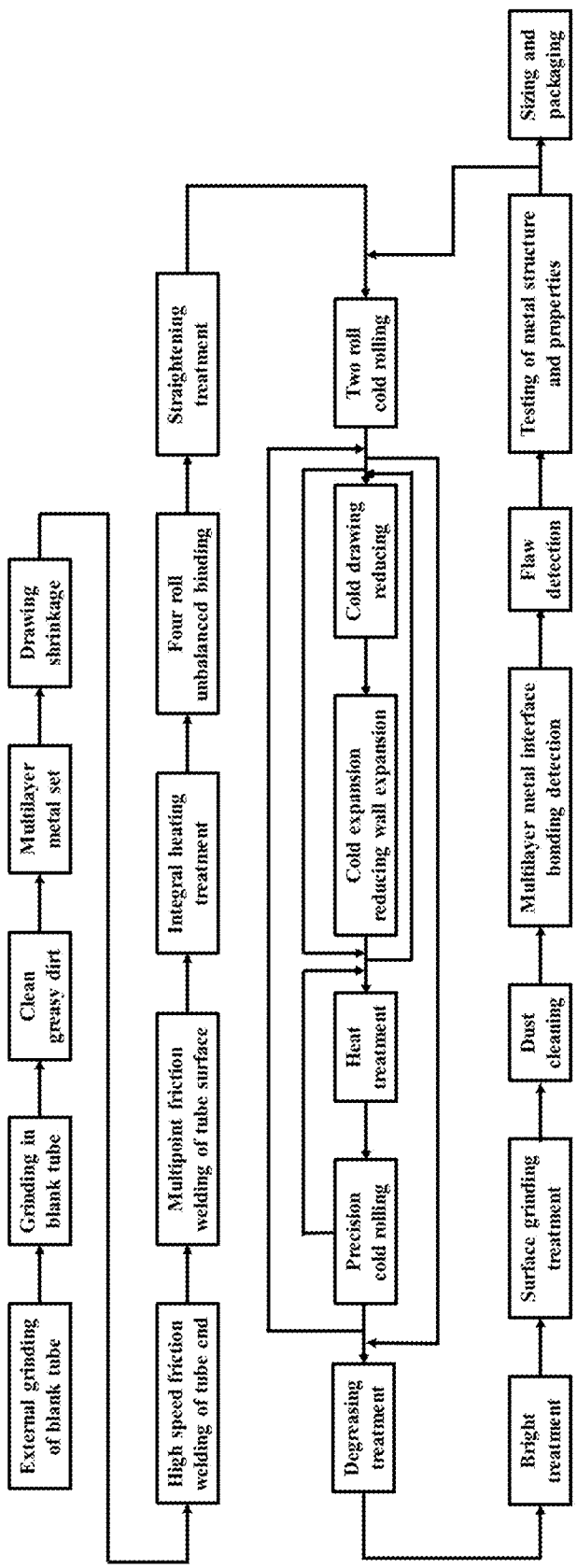
FIG. 1 is a flow chart of the present invention.

Element reference: 101—metal blank pipe, 102—composite pipe blank, 103—layered composite pipe, 1—grinding wheel head, 2—wire brush grinding head, 3—layered composite pipe blank hydraulic pusher, 4—drawing die, 5—high-speed friction welding head, 6—heating furnace, 61—flame nozzle, 62—furnace bottom roller bed, 71—active roller, 72—passive roller, 73—micro-tapered mandrel, 81—upper straightening roller, 82—lower straightening roller, 91—roller having continuous tapered section hole, 92—mandrel with tapered surface, 1001—furnace bottom conveyor belt, 10—bright cleaning furnace, 1002—bright burner nozzle, 1003—hydrogen generating device, 11—negative pressure cleaning device, 12—ultrasonic detection device, 13—eddy current flaw detection device, 14—expanding die, 15—heat treatment furnace, 151—flame nozzle, 152—furnace bottom spinning roller bed, 16—roller with hole, the 17—rolling mandrel with the tapered surface.

DETAILED DESCRIPTION OF THE PREFERRED EMBODIMENT

Referring to the drawings and embodiments, the technical solutions of the present invention will be further described below. To those skilled in the art, it is clear that the embodiments are exemplary only and should not be regarded as specific limitations to the present invention.

Embodiment 1

Figure 2:
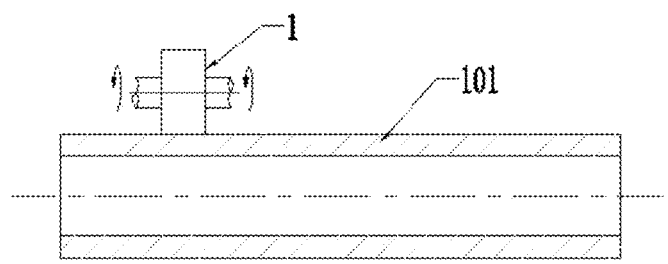
FIG. 2 is a sketch view of externally grinding blank pipes of the present invention.
Figure 3:
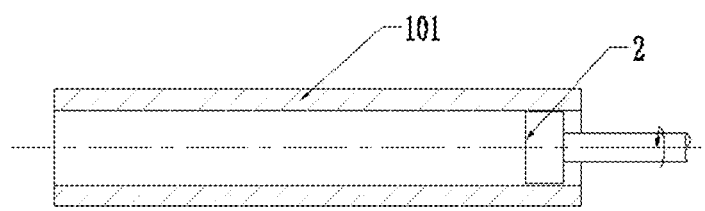
FIG. 3 is a sketch view of internally grinding the blank pipes of the present invention.
Figure 4:
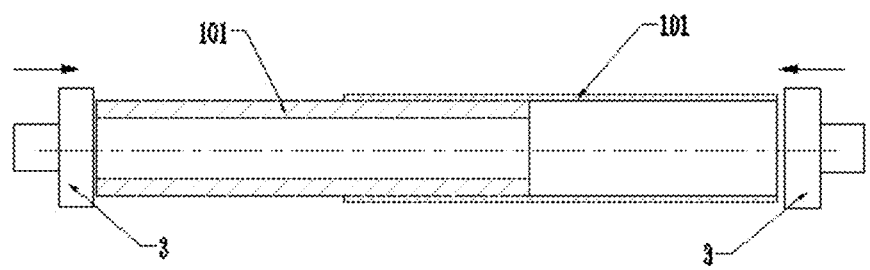
FIG. 4 is a sketch view of assembling a multilayer metal pipe of the present invention.
Figure 5:
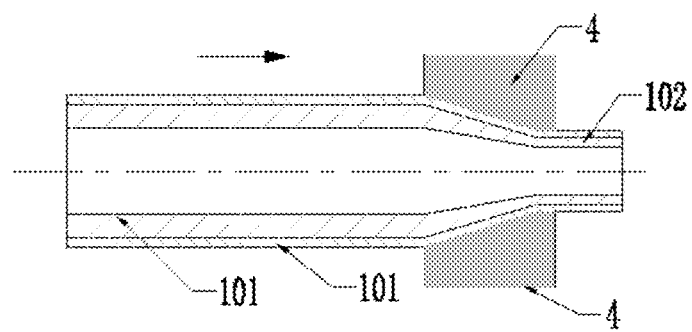
FIG. 5 is a sketch view of drawing to reduce the diameter of the present invention.
Figure 6:
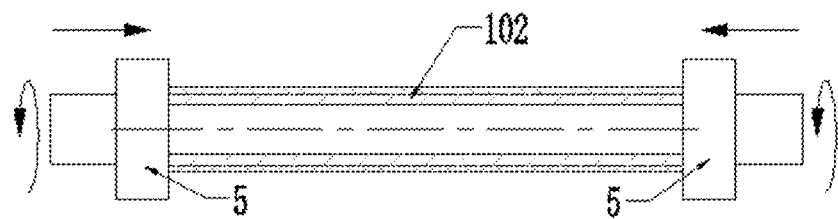
FIG. 6 is a sketch view of performing high-speed friction welding at pipe ends of the present invention.
Figure 7:
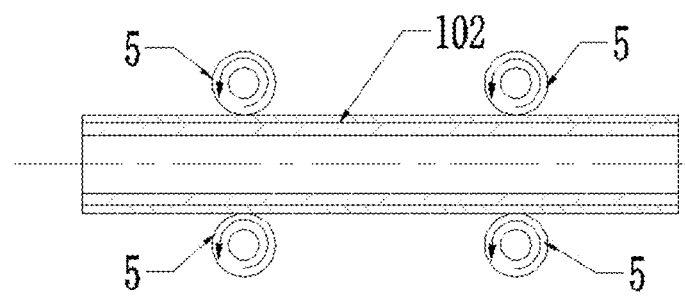
FIG. 7 is a sketch view of performing multi-point friction welding on pipe surfaces of the present invention.
Figure 8:
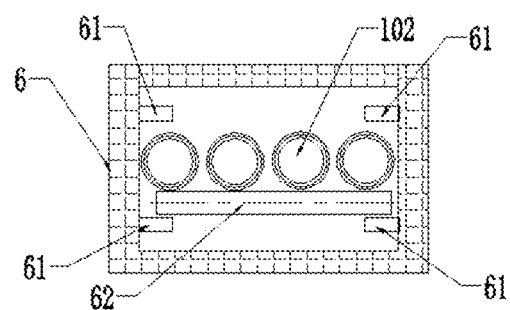
FIG. 8 is a sketch view of the overall heating of the present invention.
Figure 9:
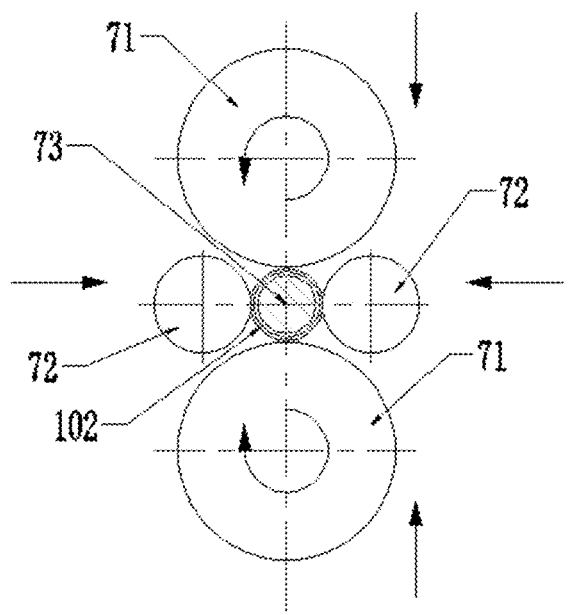
FIG. 9 is a sketch view of performing four-roller cross-rolling of the present invention.
Figure 10:
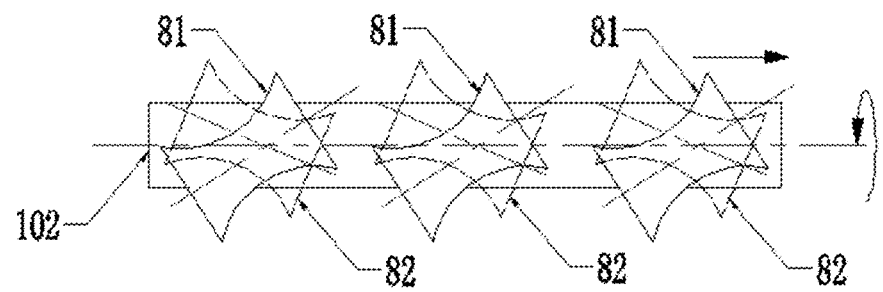
FIG. 10 is a sketch view of straightening of the present invention.
Figure 11:
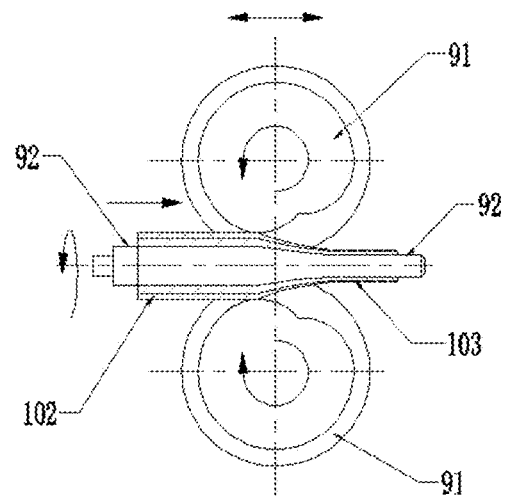
FIG. 11 is a sketch view of performing two-roller cold-rolling of the present invention.
Figure 17:
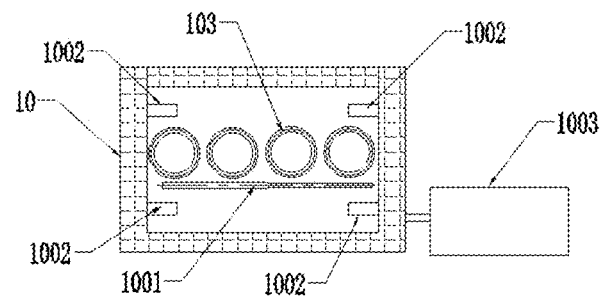
FIG. 17 is a sketch view of brightening of the present invention.
Figure 18:
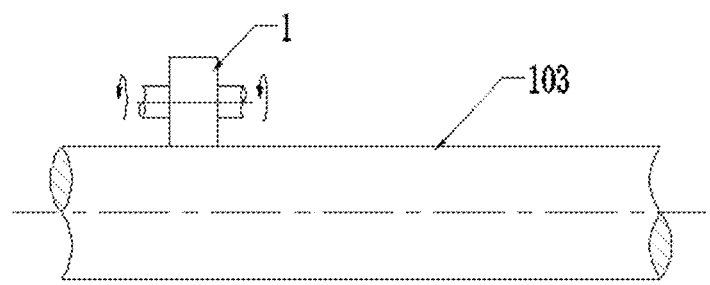
FIG. 18 is a sketch view of performing surface grinding of the present invention.
Figure 19:
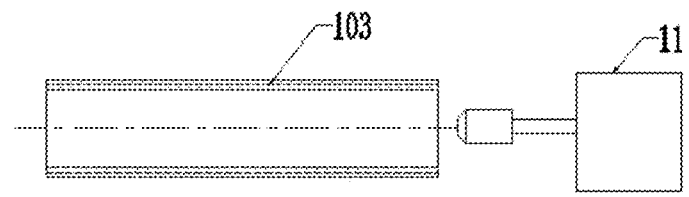
FIG. 19 is a sketch view of cleaning dust of the present invention.
Figure 20:
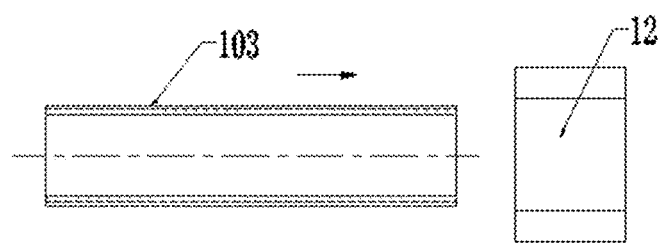
FIG. 20 is a sketch view of detecting multilayer metal interface bonding of the present invention.
Figure 21:
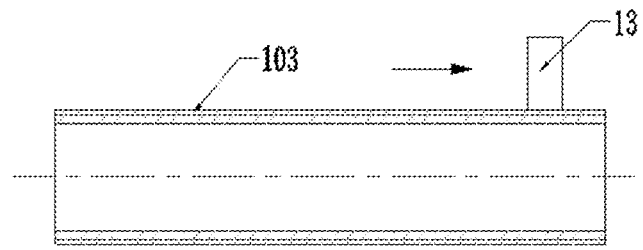
FIG. 21 is a sketch view of the detection principle of the present invention.

Referring to FIGS. 1-11 and 17-21, embodiment 1 provides a method for preparing a multilayer metal composite pipe, comprising steps of:
1) Externally grinding blank pipes: grinding the external surfaces of the metal blank pipes 101 with a grinding wheel head 1 to eliminate oxide films on the external surfaces and spiral joints caused by a previous process; wherein the grinding wheel head 1 comprises a large-grain coarse grinding wheel, a medium-grain emery cloth, and a fine-grain grinding wheel; the large-grain coarse grinding wheel is used to eliminate spiral joints on the surfaces of the blank pipes; the medium-grain emery cloth is used to grind burrs and metal granular substances left by the large-grain coarse grinding wheel, and the fine-grain grinding wheel is used to polish the surfaces of the blank pipes; a grinding thickness of the grinding wheel head 1 is 0.1 mm-5 mm; a roundness error range of the layered composite pipe blank 102 after grinding is 0 mm-0.05 mm; a hole diameter deviation is ±0.01 mm, and a surface finish satisfies a Ra0.2 standard;

When the blank pipes are used as outer pipes of the layered composite pipe, the large-grain coarse grinding wheel, the medium-grain emery cloth, and the fine-grain grinding wheel are all used for grinding; when the blank pipes are used as inner pipes of the layered composite pipe, only the large-grain coarse grinding wheel, and the medium-grain emery cloth are used for grinding, in such a manner that a plurality of scratches are left on the surfaces of the blank pipes to facilitate interface bonding between the outer pipes and the inner pipes of the layered composite pipe in subsequent processing;

2) Internally grinding the blank pipes: grinding the internal surfaces of the metal blank pipes 101 with a wire brush grinding head 2 to eliminate oxide films on the internal surfaces and quality defects caused by the previous process, and producing micro-grooves on the internal surfaces of the blank pipes; wherein a grinding thickness is 0.1 mm-1 mm, and peaks and valleys of 0.1 mm are generated; a steel wire diameter of the wire brush grinding head 2 is ≤0.1 mm; wherein no micro-groove is produced on an internal surface of an innermost pipe of the multilayer metal composite pipe;

3) Cleaning oil stains: cleaning the internal surfaces and the external surfaces of metal blank pipes 101 ground in step 2 to remove grits, metal burrs and the oil stains, which comprises a specific step of: soaking the metal blank pipes 101 in an alkaline cleaning solution to clean the internal surfaces and the external surfaces, thereby removing the grits, the metal burrs and the oil stains; wherein the metal blank pipes 101 are overturned 3-5 times in the alkaline cleaning solution, a soaking time is 5-10 minutes, and a pH value of the alkaline cleaning solution is 8-10;

4) Assembling a multilayer metal pipe: assembling the metal blank pipes 101 cleaned in the step 3 with internal and external clearances to form a multilayer metal blank pipe, which comprises a specific step of: processing the multilayer metal blank pipes 101 treated in the steps 1-3 with a layered composite pipe blank hydraulic pusher 3, thereby providing clearance fit and oppositely pushing adjacent pipes to form the multilayer metal blank pipe, wherein the clearances between the adjacent pipe layers are less than 0.5 mm;

5) Drawing to reduce a diameter: reducing the diameter of the multilayer metal blank pipe through a drawing die 4, and fully contacting adjacent pipe layers in the multilayer metal blank pipe to form an interference fit, thereby obtaining a layered composite pipe blank 102 by drawing to reduce the diameter; wherein a taper angle of a necking core head die of the drawing die 4 is 5°-15°, and a length of a core head sizing belt is 5%-20% of the diameter of the layered composite pipe; a single-pass diameter expansion capacity is 0%-10% of the diameter of the layered composite pipe, and a single-pass wall reduction is −10%-+15% of a wall thickness of the layered composite pipe;

6) Performing high-speed friction welding at the pipe ends: fusing pipe end gaps of the layered composite pipe blank 102 with a high-speed friction welding head 5, and sealing by welding to prevent internal and external surfaces of adjacent pipe layers of the layered composite pipe blank 102 from oxidizing, which comprises a specific step of: after drawing to reduce the diameter, arranging the high-speed friction welding head 5 at both ends of the layered composite pipe blank 102 to seal the pipe ends by welding; wherein the high-speed friction welding head rotates at a speed of 100 r/min-3000 r/min, and applies pressure to the pipe ends of the layered composite pipe blank 102 to increase friction between the high-speed friction welding head and the pipe ends; the pressure applied to the pipe ends of the layered composite pipe blank is determined according to pipe specifications, which is 20 t-0.01 t;

7) Performing multi-point friction welding on pipe surfaces: applying multiple sets of the high-speed friction welding heads 5 on surfaces of the layered composite pipe blank 102 with sealed pipe ends to fuse gaps between corresponding friction welding areas, thereby realizing the multi-point friction welding on the pipe surfaces of the layered composite pipe blank 102, which comprises a specific step of: after sealing the pipe ends, arranging multiple sets of the high-speed friction welding heads 5 on the surfaces of the layered composite pipe blank 102 to fuse the gaps between surface friction welding areas; wherein the high-speed friction welding heads rotate at the speed of 100 r/min-3000 r/min, and applies a pressure to an external surface of the layered composite pipe blank 102 to increase a friction between the high-speed friction welding heads and the pipe surfaces; the pressure applied to the external surface of the layered composite pipe blank is determined according to the pipe specifications, which is 5 t-0.01 t;

8) Overall heating: overall heating the layered composite pipe blank 102 after friction welding, which comprises a specific step of: after friction welding, transporting the layered composite pipe blank 102 into a heating furnace 6 through a furnace bottom roller bed 62, wherein four sets of flame nozzles 61 of the heating furnace 6 are divided into an upper layer and a lower layer in the heating furnace 6; an optimal hot working temperature is determined according to a lowest material melting point of the layered composite pipe blank 102; during heating, a difference between an actual temperature and the optimal hot working temperature is ±10° C.;

9) Performing four-roller cross-rolling: processing the heated layered composite pipe blank 102 with large deformation treatment through the four-roller cross-rolling, so that the internal and external surfaces of the adjacent pipe layers are to metallurgically composited, wherein an upper roller and a lower roller for the four-roller cross-rolling are active rollers 71, while a left roller and a right roller are passive rollers 72; during rolling, the four rollers are in contact with the heated layered composite pipe blank 102, and a micro-tapered mandrel 73 having a taper of 1:8-1:15 is arranged on the internal surface of the layered composite pipe blank 102, so as to ensure transverse extension and wall thickness deformation of the heated layered composite pipe blank 102, and to keep a large rolling force on a pipe wall during rolling; dynamic pressing is adopted during rolling to realize multi-pass rolling with small deformation; a single-pass deformation is 0-D*10%, a cumulative deformation is 85%, and a metallurgical composite rate between an internal wall of an outer pipe and an inner pipe of the layered composite pipe blank 102 is no less than 95%; wherein D is an external diameter of the layered composite pipe blank 102;

10) Straightening: straightening the layered composite pipe blank 102 after the four-roller cross-rolling to eliminate bending and flattening problems caused during cooling as well as to eliminate an internal residual stress, which comprises a specific step of: using multiple sets of upper straightening rollers 81 and lower straightening rollers 82, which are arranged obliquely on the surfaces of the layered composite pipe blank 102, for straightening; wherein the layered composite pipe blank 102 advances spirally during straightening to ensure all areas on the surfaces of the layered composite pipe blank 102 are correspondingly straightened and deformed 11) Performing two-roller cold-rolling: processing the straightened layered composite pipe blank 102 with plastic deformation and crushing metal crystal grains through the two-roller cold-rolling, so as to obtain a layered composite pipe 103 with a reduced diameter, which comprises a specific step of: placing the straightened layered composite pipe blank 102 in a closed deformation hole for plastic deformation, wherein the closed deformation hole is formed by an upper roller 91 and a lower roller 91 both having a continuous tapered section hole, as well as by a set of mandrels 92 with tapered surfaces; a maximum deformation is 80%; the metal crystal grains are crushed, and a crystal grain size grade is 4-7; during rolling; the upper and lower rollers 91 translate horizontally while rotate oppositely, thereby pushing the layered composite pipe blank 102 to extend in a longitudinal direction; at extreme positions of the upper and lower rollers 91, the mandrels 92 rotate for pipe advancing; a rotation range of the mandrels 92 is 0°-75°, and a pipe advancing volume per each pass is 0-5 mm; the layered composite pipe 103 with the reduced diameter is obtained by the two-roller cold-rolling; the layered composite pipe 103 with the reduced diameter satisfies product specification and performance requirements;

12) Degreasing: cleaning the rolled layered composite pipe 103 to remove surface oil stains, which comprises a specific step of: soaking the rolled layered composite pipe 103 in an alkaline cleaning solution to clean the internal and external surfaces, thereby removing the grits, the metal burrs and the oil stains; wherein the layered composite pipe 103 is overturned 3-5 times in the alkaline cleaning solution, a soaking time is 5-10 minutes, and a pH value of the alkaline cleaning solution is 8-10;

13) Brightening: brightening the degreased layered composite pipe 103 to reduce oxide scales on a surface of the metal pipe, which comprises a specific step of: transporting the degreased layered composite pipe 103 into a bright cleaning furnace 10 through a furnace bottom conveyor belt 1001, wherein four sets of bright furnace nozzles 1002 are divided into an upper layer and a lower layer in the bright cleaning furnace 10, so as to ensure uniform heating of the layered composite pipe 103; the bright cleaning furnace 10 is connected to a hydrogen generating device 1003 which generates hydrogen, and the hydrogen undergoes combustion reaction with oxygen to provide heat energy for the bright cleaning furnace 10;

14) Performing surface grinding: processing the brightened layered composite pipe 103 with the surface grinding to eliminate surface oxide films and pipe surface quality problems caused by the previous steps, and then polishing, which comprises a specific step of: grinding the external surface of the layered composite pipe 103 with a grinding wheel head 1, wherein the grinding wheel grinding head 1 is a fine-grain grinding wheel for polishing the surfaces of the blank pipes, and a grinding thickness is 0.1 mm-5 mm;

15) Cleaning dust: cleaning the internal and external surfaces of the layered composite pipe 103 with a negative pressure cleaning device 11, thereby removing the surface grinding head grit and the metal burrs;

16) Detecting multilayer metal interface bonding: performing ultrasonic detecting on the cleaned layered composite pipe 103 with an ultrasonic detection device 12, so as to comprehensively obtain the metallurgical bonding information of the internal and external surfaces between the adjacent pipe layers of the layered composite pipe; and discarding an unqualified layered composite pipe 103 having unqualified metallurgical areas;

17) Detecting flaws: performing the ultrasonic detecting on the surfaces of the cleaned layered composite pipe 103 with an eddy current flaw detection device 13 to obtain crack defect information of the layered composite pipe 103 after deformation and discarding the unqualified layered composite pipe 103;

18) Testing metal structure performance: sampling and testing the cleaned layered composite pipe 103 through physical testing and chemical testing; analyzing the mechanical properties, the grain sizes, and the corrosion resistances of each pipe layer, and evaluating metal pipe performance; for the layered composite pipe 103 with unqualified metal structure performance, repeating the steps 11-18 until the qualified layered composite pipe 103 is obtained; and 19) Sizing and packaging: sizing and packaging the qualified layered composite pipe 103 to facilitate transportation and avoiding corrosion by harmful substances.

The method of embodiment 1 is suitable for preparing multilayer metal composite pipes with a diameter of Φ8 mm-Φ800 mm, a wall thickness of 3 mm-60 mm, and an accuracy level of 4-7.

Embodiment 2

Figure 14:
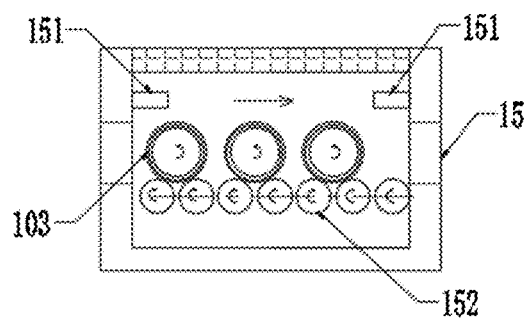
FIG. 14 is a sketch view of performing heat treatment of the present invention.
Figure 15:
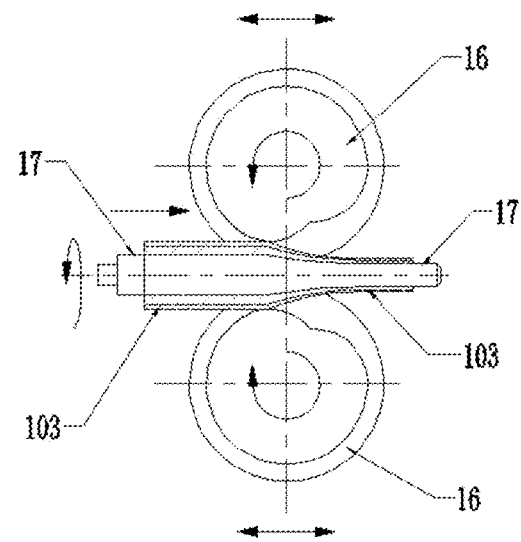
FIG. 15 is a sketch view of performing multi-roller precise cold-rolling of the present invention.
Figure 16:
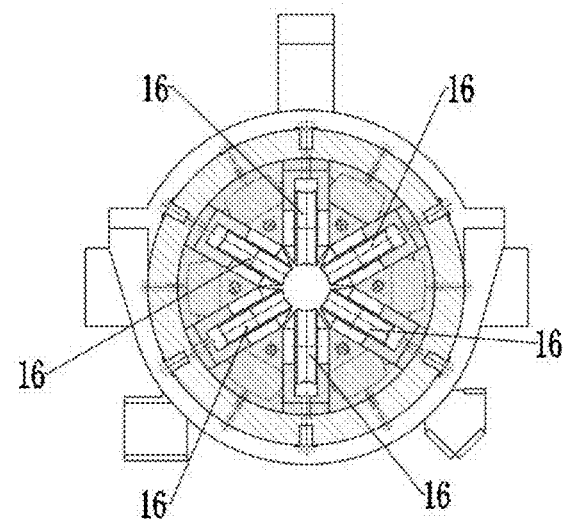
FIG. 16 is a sketch view of performing six-roller precise cold-rolling of the present invention.

Referring to FIGS. 1-11 and 14-21, in order to obtain a multilayer metal composite pipe with higher precision, better performance, and more outstanding extreme specifications, when the layered composite pipe 103 with the reduced diameter obtained by the step 11 of the embodiment 1 fails specification and performance requirements, steps Z3 and Z4 are added before performing step 12. According to the embodiment 2, a method for preparing a multilayer metal composite pipe is provided, comprising steps of:

Steps 1-11 are the same as those in the embodiment 1.

Z3) Performing heat treatment: performing the heat treatment on the layered composite pipe 103 with the reduced diameter to eliminate a residual stress and cause dynamic recrystallization of the metal crystal grains, which comprises a specific step of: transporting the layered composite pipe 103 with the reduced diameter into a heat treatment furnace 15 through a furnace bottom spinning roller bed 152, wherein two flame nozzles 151 are arranged separately at a top layer of the heating treatment furnace 15; an optimal hot working temperature is determined according to a lowest material melting point of the layered composite pipe blank 102; during heating, a difference between an actual temperature and the optimal hot working temperature is ±10° C.;

Z4) Performing precise cold-rolling: after the heat treatment, processing the layered composite pipe 103 with small-deformation cold-rolling through a multi-roller cold-rolling technology, so as to cause further plastic deformation and crushing the metal crystal grains, thereby reducing the diameter and a wall thickness of the composite pipe to obtain a precisely rolled layered composite pipe 103 with a finer grain size and a better metal pipe toughness;

The precision cold-rolling adopts a six-roller cold-rolling mill; the six-roller cold-rolling mill comprises six rollers 16 each having a hole, and a set of rolling mandrels 17 with tapered surfaces, wherein external diameters of the holes are identical; after cold-drawing, cold-expansion and the heat treatment, the layered composite pipe 103 is placed in the rollers 16, and forms a closed deformation hole with the rolling mandrels 17; the layered composite pipe 103 is plastically deformed in the closed deformation hole while the metal crystal grains of the layered composite pipe 103 are crushed; during rolling, the rollers 16 translate horizontally while rotate oppositely, thereby pushing the layered composite pipe 103 to extend in a longitudinal direction; at extreme positions of the rollers 16, the rolling mandrels 17 rotate for advancing the layered composite pipe 103; a rotation range of the rolling mandrels is 0°-60°, and a pipe advancing volume per each pass is 0-3 mm; after the six-roller precision cold-rolling, a maximum deformation of the layered composite pipe 103 is 20%, a metal pipe crystal grain size grade is 5-9, a wall thickness tolerance is ≤5%, an external diameter roundness error is 0 mm-0.05 mm, a wall thickness unevenness is ≤5%, and a straightness is ≤0.15 mm/m; according to the embodiment 2, a quantity of the rollers 16 in the multi-roller cold-rolling mill may also be three, four or five;

If the layered composite pipe 103 obtained by the step Z4 still fails the specification and performance requirements, repeating the steps Z3 and Z4 in sequence for at least once until the layered composite pipe 103 satisfies the specification and performance requirements; and then performing the steps 12-19.

Steps 12-19 are the same as those in the embodiment 1.

The method of the embodiment 2 is suitable for preparing multilayer metal composite pipes with a diameter of Φ8 mm-Φ600 mm, a wall thickness of 1 mm-30 mm, a crystal grain size grade of 5-9, a wall thickness tolerance of ≤5%, an external diameter roundness error of 0 mm-0.05 mm, a wall thickness unevenness of ≤5%, and a straightness of ≤0.15 mm/m.

Embodiment 3

Figure 12:
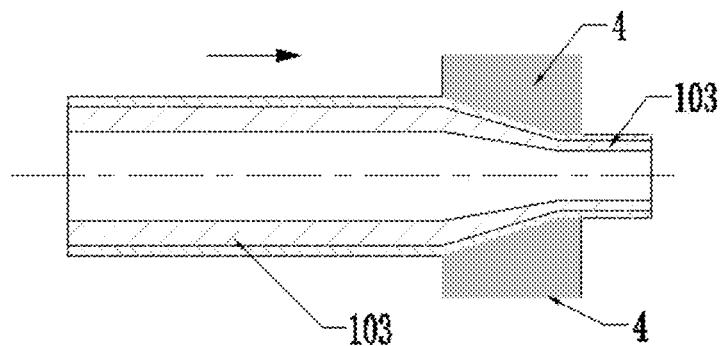
FIG. 12 is a sketch view of performing cold-drawing to reduce the diameter of the present invention.

Referring to FIGS. 1-12 and 14-21, in order to obtain a multilayer metal composite pipe with higher precision, better performance, and more outstanding extreme specifications, when the layered composite pipe 103 with the reduced diameter obtained by the step 11 of the embodiment 2 fails specification and performance requirements, and generate plastic deformation which mainly reduces a diameter and secondarily reduces a wall thickness is needed, a step Z1 is added before performing step Z3. According to the embodiment 3, a method for preparing a multilayer metal composite pipe is provided, comprising steps of:

Steps 1-11 are the same as those in the embodiment 1.

Z1) Performing cold-drawing to reduce the diameter: processing the layered composite pipe 103 with the drawing die 4 to generate plastic deformation which mainly reduces the diameter and secondarily reduces the wall thickness, thereby obtaining the layered composite pipe 103 whose diameter is reduced by the cold-drawing; wherein a taper angle of a necking core head die of the drawing die 4 is 5°-15°, and a length of a core head sizing belt is 5-20% of the diameter of the layered composite pipe; a single-pass diameter expansion capacity is 0%-10% of the diameter of the layered composite pipe, and a single-pass wall reduction is −10%-+15% of a wall thickness of the layered composite pipe;

If the layered composite pipe 103 obtained by the cold-drawing or the cold-expansion fails diameter and wall thickness reduction requirements, then repeating the step Z1 for at least once until the layered composite pipe 103 satisfies the diameter and wall thickness reduction requirements, and then performing the steps Z3 and Z4;

Steps Z3, Z4 and 12-19 are the same as those in the embodiment 2.

The method of the embodiment 3 is suitable for preparing multilayer metal composite pipes with a diameter of Φ3 mm-Φ600 mm, a wall thickness of 1 mm-30 mm, a crystal grain size grade of 5-9, a wall thickness tolerance of ≤5%, an external diameter roundness error of 0 mm-0.05 mm, a wall thickness unevenness of ≤5%, and a straightness of ≤0.15 mm/m.

Embodiment 4

Figure 13:
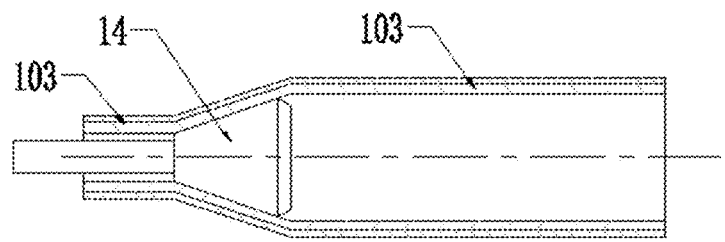
FIG. 13 is a sketch view of performing cold-expansion to reduce a wall thickness and increase the diameter of the present invention.

Referring to FIGS. 1-11 and 13-21, in order to obtain a multilayer metal composite pipe with higher precision, better performance, and more outstanding extreme specifications, when the layered composite pipe 103 with the reduced diameter obtained by the step 11 of the embodiment 2 fails specification and performance requirements, and generate plastic deformation which mainly reduces a diameter and secondarily reduces a wall thickness is needed, a step Z2 is added before performing step Z3. According to the embodiment 4, a method for preparing a multilayer metal composite pipe is provided, comprising steps of:

Steps 1-11 are the same as those in the embodiment 1.

Z2) Performing cold-expansion to reduce the wall thickness and increase the diameter: processing the layered composite pipe 103 with an expansion die 14 to generate the plastic deformation which mainly reduces the wall thickness and secondarily increases the diameter, thereby obtaining the layered composite pipe 103 whose diameter is changed by the cold-expansion; wherein a taper angle of a core head die of the expansion die 14 is 5°-15°, and a length of a core head sizing belt is 10 mm-300 mm; a single-pass diameter expansion capability is 0%-10% of the diameter of the layered composite pipe, and a single-pass wall reduction is 0%-15% of the wall thickness of the layered composite pipe;

If the layered composite pipe 103 obtained by the cold-drawing or the cold-expansion fails diameter and wall thickness reduction requirements, then repeating the step Z2 for at least once until the layered composite pipe 103 satisfies the diameter and wall thickness reduction requirements, and then performing the steps Z3 and Z4;

Steps Z3, Z4 and 12-19 are the same as those in the embodiment 2.

The method of the embodiment 3 is suitable for preparing multilayer metal composite pipes with a diameter of Φ8 mm-Φ600 mm, a wall thickness of 0.5 mm-10 mm, a crystal grain size grade of 5-9, a wall thickness tolerance of ≤5%, an external diameter roundness error of 0 mm-0.05 mm, a wall thickness unevenness of ≤5%, and a straightness of ≤0.15 mm/m.

Embodiment 5

Referring to FIGS. 1-21, in order to obtain a multilayer metal composite pipe with higher precision, better performance, and more outstanding extreme specifications, when the layered composite pipe 103 with the reduced diameter obtained by the step 11 of the embodiment 2 fails specification and performance requirements, and generate plastic deformation which mainly reduces a diameter and secondarily reduces a wall thickness is needed, steps Z1 and Z2 are added before performing step Z3. According to the embodiment 5, a method for preparing a multilayer metal composite pipe is provided, comprising steps of:

Steps 1-11 are the same as those in the embodiment 1.

Z1) Performing cold-drawing to reduce the diameter: processing the layered composite pipe 103 with the drawing die 4 to generate plastic deformation which mainly reduces the diameter and secondarily reduces the wall thickness, thereby obtaining the layered composite pipe 103 whose diameter is reduced by the cold-drawing; wherein a taper angle of a necking core head die of the drawing die 4 is 5°-15°, and a length of a core head sizing belt is 5-20% of the diameter of the layered composite pipe; a single-pass diameter expansion capacity is 0%-10% of the diameter of the layered composite pipe, and a single-pass wall reduction is −10%-+15% of a wall thickness of the layered composite pipe;

Z2) Performing cold-expansion to reduce the wall thickness and increase the diameter: processing the layered composite pipe 103 with an expansion die 14 to generate the plastic deformation which mainly reduces the wall thickness and secondarily increases the diameter, thereby obtaining the layered composite pipe 103 whose diameter is changed by the cold-expansion; wherein a taper angle of a core head die of the expansion die 14 is 5°-15°, and a length of a core head sizing belt is 10 mm-300 mm; a single-pass diameter expansion capability is 0%-10% of the diameter of the layered composite pipe, and a single-pass wall reduction is 0%-15% of the wall thickness of the layered composite pipe;

If the layered composite pipe 103 obtained by the cold-drawing or the cold-expansion fails diameter and wall thickness reduction requirements, then repeating the steps Z1 and Z2 in sequence for at least once until the layered composite pipe 103 satisfies the diameter and wall thickness reduction requirements, and then performing the steps Z3 and Z4;

Steps Z3, Z4 and 12-19 are the same as those in the embodiment 2.

The method of the embodiment 5 is suitable for preparing multilayer metal composite pipes with a diameter of Φ3 mm-Φ600 mm, a wall thickness of 0.5 mm-10 mm, a crystal grain size grade of 5-9, a wall thickness tolerance of ≤5%, an external diameter roundness error of 0 mm-0.05 mm, a wall thickness unevenness of ≤5%, and a straightness of ≤0.15 mm/m.

According to the embodiments 1-5, the optimal hot working temperatures of different metals can be selected with reference to Table 1. Production parameters of the four-roller cross-rolling, the cold-drawing, the cold-expansion, the two-roller cold-rolling, and the precise cold-rolling can be selected according to the material of the layered composite pipe, so as to control the deformation of rolling, cold-drawing, and cold-expansion within ranges listed in Table 3. Parameters of each step can be selected from Table 2 according to the material of the multilayer metal composite pipe.

TABLE 1

Optimal hot working temperatures of metals

| | Material | | | | |
|---|---|---|---|---|---|
| Temperature | Steel | Copper alloy | Aluminum alloy | Titanium alloy | Magnesium alloy |
| Optimal hot working temperature | 950-1150° C. | 550-650° C. | 580-680° C. | 850-890° C. | 380-420° C. |

TABLE 2

Parameters for multilayer metal composite pipes composed of different materials

| | Material | | |
|---|---|---|---|
| Parameter | Steel-titanium composite | Copper-aluminum composite | Magnesium-aluminum composite |
| Drawing die parameter | taper angle of necking core head die is 10°-15°, length of core head sizing belt is 5-8% of diameter of layered composite pipe | taper angle of necking core head die is 8°-15°, length of core head sizing belt is 7-9% of diameter of layered composite pipe | taper angle of necking core head die is 5°-10°, length of core head sizing belt is 8-10% of diameter of layered composite pipe |
| Expansion die parameter | taper angle of core head die is 10°-15°, length of core head sizing belt is 10-150 mm | taper angle of core head die is 8°-15°, length of core head sizing belt is 10-200 mm | taper angle of core head die is 5°-10°, length of core head sizing belt is 10-300 mm |
| Overall heating and heat treatment temperature | 850-890° C. | 550-650° C. | 380-420° C. |
| Pipe end and surface multi-point friction welding parameter | Friction welding head rotation speed is 1000-3000 r/min, pressure applied is 20-0.01 t | Friction welding head rotation speed is 1000-3000 r/min, pressure applied is 15-0.01 t | Friction welding head rotation speed is 1000-3000 r/min, pressure applied is 8-0.01 t |
| Four-roller cross-rolling parameter | Taper of micro-tapered mandrel is 1:8-1:15 | Taper of micro-tapered mandrel is 1:8-1:15 | Taper of micro-tapered mandrel is 1:8-1:15 |

TABLE 3

| Material | Four-roller cross-rolling maximum deformation | Cold-drawing deformation (single pass) | Cold-expansion deformation (single pass) | Two-roller cold-rolling deformation (total) | Precise cold-rolling deformation |
|---|---|---|---|---|---|
| Steel-titanium composite pipe | ≤85% | ≤15% | ≤15% | ≤55% | ≤20% |
| Copper-aluminum composite pipe | ≤70% | ≤15% | ≤15% | ≤45% | ≤20% |
| Magnesium-aluminum | ≤65% | ≤8% | ≤8% | ≤30% | ≤15% |

Tables 1-3 only list preparation parameter ranges for several commonly used metal materials. The method for preparing the multilayer metal composite pipe of the present invention is not limited to the materials listed in the tables. Specific parameters in each step are determined based on characteristics of the materials.

What is claimed is:

1. A method for preparing a multilayer metal composite pipe, comprising steps of:
   1) grinding external surfaces of metal blank pipes (101) to eliminate oxide films on the external surfaces and spiral joints caused by a previous process;
   2) grinding internal surfaces of the metal blank pipes (101) to eliminate oxide films on the internal surfaces and quality defects caused by the previous process, and producing micro-grooves on the internal surfaces of the blank pipes; wherein no micro-groove is produced on an internal surface of an innermost pipe of the multilayer metal composite pipe;
   3) cleaning the internal surfaces and the external surfaces of metal blank pipes (101) ground in the step 2 to remove grits, metal burrs and the oil stains;
   4) assembling the metal blank pipes (101) cleaned in the step 3 with internal and external clearances to form a multilayer metal blank pipe;
   5) reducing the diameter of the multilayer metal blank pipe through a drawing die (4), and fully contacting adjacent pipe layers in the multilayer metal blank pipe to form an interference fit, thereby obtaining a layered composite pipe blank (102) by drawing to reduce the diameter;
   6) fusing pipe end gaps of the layered composite pipe blank (102) with a high-speed friction welding head (5), and sealing by welding to prevent internal and external surfaces of adjacent pipe layers of the layered composite pipe blank (102) from oxidizing;
   7) applying multiple sets of the high-speed friction welding heads (5) on surfaces of the layered composite pipe blank (102) with sealed pipe ends to fuse gaps between corresponding friction welding areas, thereby realizing the multi-point friction welding on the pipe surfaces of the layered composite pipe blank (102);
   8) overall heating the layered composite pipe blank (102) after friction welding;
   9) processing the heated layered composite pipe blank (102) with large deformation treatment through the four-roller cross-rolling, so that the internal and external surfaces of the adjacent pipe layers are metallurgically composited;
   10) straightening the layered composite pipe blank (102) after the four-roller cross-rolling to eliminate bending and flattening problems caused during cooling as well as to eliminate an internal residual stress;
   11) processing the straightened layered composite pipe blank (102) with plastic deformation and crushing metal crystal grains through the two-roller cold-rolling, so as to obtain a layered composite pipe (103) with a reduced diameter;
   12) cleaning the rolled layered composite pipe (103) to remove surface oil stains;
   13) brightening the degreased layered composite pipe (103) to reduce oxide scales on a surface of the metal pipe;
   14) processing the brightened layered composite pipe (103) with the surface grinding to eliminate surface oxide films and pipe surface quality problems caused by the previous steps, and then polishing;
   15) cleaning internal and external surfaces of the polished layered composite pipe (103) to remove surface grinding head grit and metal burrs;
   16) performing ultrasonic detecting on the cleaned layered composite pipe (103) to obtain metallurgical bonding information of the internal and external surfaces between adjacent pipe layers of the layered composite pipe (103), and discarding an unqualified composite pipe (103) having unqualified metallurgical areas;
   17) performing the ultrasonic detecting on the surfaces of the cleaned layered composite pipe (103) to obtain crack defect information of the layered composite pipe (103) after deformation, and discarding the unqualified layered composite pipe (103);
   18) sampling and testing the qualified layered composite pipe (103); analyzing mechanical properties, grain sizes, and corrosion resistances of each pipe layer, and evaluating metal pipe performance; for the layered composite pipe (103) with unqualified metal structure performance, repeating the steps 11-18 until the qualified layered composite pipe (103) is obtained; and
   19) sizing and packaging the qualified layered composite pipe (103) to facilitate transportation and avoiding corrosion by harmful substances.

2. The method, as recited in claim 1, wherein if the layered composite pipe (103) with the reduced diameter obtained through the steps 1-11 fails specification and performance requirements, a step Z3 and a step Z4 are inserted after the step 11 before performing the steps 12-19;
   wherein step Z3 includes: performing the heat treatment on the layered composite pipe (103) with the reduced diameter to eliminate a residual stress and cause dynamic recrystallization of the metal crystal grains; and wherein step Z4 includes: after the heat treatment, processing the layered composite pipe (103) with small-deformation cold-rolling through a multi-roller cold-rolling technology, so as to cause further plastic deformation and crushing the metal crystal grains, thereby reducing the diameter and a wall thickness of the composite pipe; if the layered composite pipe (103) obtained by the step Z4 still fails the specification and performance requirements, repeating the steps Z3 and Z4 in sequence for at least once until the layered composite pipe (103) satisfies the specification and performance requirements; and then performing the steps 12-19.

3. The method, as recited in claim 1, wherein if the layered composite pipe (103) with the reduced diameter obtained through the steps 1-11 fails specification and performance requirements, at least one of a step Z1 and a step Z2 is inserted after the step 11 to reduce the diameter and a wall thickness, and then a step Z3 and a step Z4 are inserted before performing the steps 12-19;

wherein step Z1 includes: processing the layered composite pipe (103) with the drawing die (4) to generate plastic deformation which mainly reduces the diameter and secondarily reduces the wall thickness, thereby reducing the diameter of the layered composite pipe (103) by cold-drawing;

wherein step Z2 includes: processing the layered composite pipe (103) with an expansion die (14) to generate the plastic deformation which mainly reduces the wall thickness and secondarily increases the diameter, thereby obtaining the layered composite pipe (103) whose diameter is changed by the cold-expansion;

after at least one of the steps Z1 and Z2 is performed, if the layered composite pipe (103) obtained by the cold-drawing or the cold-expansion fails diameter and wall thickness reduction requirements, then repeating at least one of the steps Z1 and Z2 for at least once until the layered composite pipe (103) satisfies the diameter and wall thickness reduction requirements, and then performing the steps Z3 and Z4;

wherein step Z3 includes: performing the heat treatment on the layered composite pipe (103) with the reduced diameter to eliminate a residual stress and cause dynamic recrystallization of the metal crystal grains; and wherein step Z4 includes: after the heat treatment, processing the layered composite pipe (103) with small-deformation cold-rolling through a multi-roller cold-rolling technology, so as to cause further plastic deformation and crushing the metal crystal grains, thereby reducing the diameter and the wall thickness of the composite pipe to obtain a precisely rolled layered composite pipe (103) with a finer grain size and a better metal pipe toughness;

if the layered composite pipe (103) obtained by the step Z4 still fails specification and performance requirements, repeating the steps Z3 and Z4 in sequence for at least once until the layered composite pipe (103) satisfies the specification and performance requirements; and then performing the steps 12-19;

if the layered composite pipe (103), which is obtained by repeating the steps Z3 and Z4 in sequence for at least once, still fails the specification and performance requirements, then repeating the steps Z1-Z4 for at least once until the layered composite pipe (103) satisfies the specification and performance requirements.

4. The method, as recited in claim 1, wherein in the step 1, further comprises grinding the external surfaces of the metal blank pipes (101) with a grinding wheel head (1), wherein the grinding wheel head (1) comprises a large-grain coarse grinding wheel, a medium-grain emery cloth, and a fine-grain grinding wheel; the large-grain coarse grinding wheel is used to eliminate spiral joints on the surfaces of the blank pipes; the medium-grain emery cloth is used to grind burrs and metal granular substances left by the large-grain coarse grinding wheel; and the fine-grain grinding wheel is used to polish the surfaces of the blank pipes; a grinding thickness of the grinding wheel head (1) is 0.1 mm-5 mm; a roundness error range of the layered composite pipe blank (102) after grinding is 0 mm-0.05 mm; a hole diameter deviation is ±0.01 mm; and a surface finish satisfies a Ra0.2 standard;

when the blank pipes are used as outer pipes of the layered composite pipe, the large-grain coarse grinding wheel, the medium-grain emery cloth, and the fine-grain grinding wheel are all used for grinding; when the blank pipes are used as inner pipes of the layered composite pipe, only the large-grain coarse grinding wheel and the medium-grain emery cloth are used for grinding, in such a manner that a plurality of scratches are left on the surfaces of the blank pipes to facilitate interface bonding between the outer pipes and the inner pipes of the layered composite pipe in subsequent processing;

in the step 2, further comprises grinding the internal surfaces of the metal blank pipes (101) with a wire brush grinding head (2), wherein a grinding thickness is 0.1 mm-1 mm, and peaks and valleys of 0.1 mm are generated; a steel wire diameter of the wire brush grinding head (2) is ≤0.1 mm;

in the step 3, further comprises soaking the metal blank pipes (101) in an alkaline cleaning solution to clean the internal surfaces and the external surfaces, thereby removing the grits, the metal burrs and the oil stains; wherein the metal blank pipes (101) are overturned 3-5 times in the alkaline cleaning solution, a soaking time is 5-10 minutes, and a pH value of the alkaline cleaning solution is 8-10.

5. The method, as recited in claim 1, wherein in the step 4, further comprises processing the multilayer metal blank pipes (101) treated in the steps 1-3 with a layered composite pipe blank hydraulic pusher (3), thereby providing clearance fit and oppositely pushing adjacent pipes to form the multilayer metal blank pipe, wherein the clearances between the adjacent pipe layers are less than 0.5 mm;

in the step 5, a taper angle of a necking core head die of the drawing die (4) is 5°-15°, and a length of a core head sizing belt is 5%-20% of the diameter of the layered composite pipe; a single-pass diameter expansion capacity is 0%-10% of the diameter of the layered composite pipe, and a single-pass wall reduction is −10%-+15% of a wall thickness of the layered composite pipe;

in the step 6, further comprises after drawing to reduce the diameter, arranging the high-speed friction welding head (5) at both ends of the layered composite pipe blank (102) to seal the pipe ends by welding; wherein the high-speed friction welding head rotates at a speed of 100 r/min-3000 r/min, and applies a pressure to the pipe ends of the layered composite pipe blank (102) to increase a friction between the high-speed friction welding head and the pipe ends; the pressure applied to the pipe ends of the layered composite pipe blank is determined according to pipe specifications, which is 20 t-0.01 t;

in the step 7, further comprises after sealing the pipe ends, arranging multiple sets of the high-speed friction welding heads (5) on the surfaces of the layered composite pipe blank (102) to fuse the gaps between surface friction welding areas; wherein the high-speed friction welding heads rotate at the speed of 100 r/min-3000 r/min, and applies a pressure to an external surface of the layered composite pipe blank (102) to increase a friction between the high-speed friction welding heads and the pipe surfaces; the pressure applied to the external surface of the layered composite pipe blank is determined according to the pipe specifications, which is 5 t-0.01 t.

6. The method, as recited in claim 1, wherein in the step 8, further comprises: after friction welding, transporting the layered composite pipe blank (102) into a heating furnace (6) through a furnace bottom roller bed (62), wherein four sets of flame nozzles (61) of the heating furnace (6) are divided into an upper layer and a lower layer in the heating furnace (6); an optimal hot working temperature is determined according to a lowest material melting point of the layered composite pipe blank (102); during heating, a difference between an actual temperature and the optimal hot working temperature is ±10° C.;

in the step 9, further comprises processing the heated layered composite pipe blank (102) with the large deformation treatment through the four-roller cross-rolling, wherein an upper roller and a lower roller for the four-roller cross-rolling are active rollers (71), while a left roller and a right roller are passive rollers (72); during rolling, the four rollers are in contact with the heated layered composite pipe blank (102), and a micro-tapered mandrel (73) having a taper of 1:8-1:15 is arranged on the internal surface of the layered composite pipe blank (102), so as to ensure transverse extension and wall thickness deformation of the heated layered composite pipe blank (102), and to keep a large rolling force on a pipe wall during rolling; dynamic pressing is adopted during rolling to realize multi-pass rolling with small deformation; a single-pass deformation is 0-D*10%, a cumulative deformation is 85%, and a metallurgical composite rate between an internal wall of an outer pipe and an inner pipe of the layered composite pipe blank (102) is no less than 95%; wherein D is an external diameter of the layered composite pipe blank (102);

in the step 10, further comprises: using multiple sets of upper straightening rollers (81) and lower straightening rollers (82), which are arranged obliquely on the surfaces of the layered composite pipe blank (102), for straightening; wherein the layered composite pipe blank (102) advances spirally during straightening to ensure all areas on the surfaces of the layered composite pipe blank (102) are correspondingly straightened and deformed.

7. The method, as recited in claim 1, wherein in the step 11, further comprises: placing the straightened layered composite pipe blank (102) in a closed deformation hole for plastic deformation, wherein the closed deformation hole is formed by an upper roller (91) and a lower roller (91) both having a continuous tapered section hole, as well as by a set of mandrels (92) with tapered surfaces; a maximum deformation is 80%; the metal crystal grains are crushed, and a crystal grain size grade is 4-7; during rolling; the upper and lower rollers (91) translate horizontally while rotate oppositely, thereby pushing the layered composite pipe blank (102) to extend in a longitudinal direction; at extreme positions of the upper and lower rollers (91), the mandrels (92) rotate for pipe advancing; a rotation range of the mandrels (92) is 0°-75°, and a pipe advancing volume per each pass is 0-5 mm; the layered composite pipe (103) with the reduced diameter is obtained by the two-roller cold-rolling.

8. The method, as recited in claim 3, wherein in the step Z1, a taper angle of a necking core head die of the drawing die (4) is 5°-15°, and a length of a core head sizing belt is 5-20% of the diameter of the layered composite pipe; a single-pass diameter expansion capacity is 0%-10% of the diameter of the layered composite pipe, and a single-pass wall reduction is −10%-+15% of a wall thickness of the layered composite pipe;

in the step Z2, a taper angle of a core head die of the expansion die (14) is 5°-15°, and a length of a core head sizing belt is 10 mm-300 mm; a single-pass diameter expansion capability is 0%-10% of the diameter of the layered composite pipe, and a single-pass wall reduction is 0%-15% of the wall thickness of the layered composite pipe.

9. The method, as recited in claim 2, wherein in the step Z3, further comprises: transporting the layered composite pipe (103) with the reduced diameter into a heat treatment furnace (15) through a furnace bottom spinning roller bed (152), wherein two flame nozzles (151) are arranged separately at a top layer of the heating treatment furnace (15); an optimal hot working temperature is determined according to a lowest material melting point of the layered composite pipe blank (102); during heating, a difference between an actual temperature and the optimal hot working temperature is ±10° C.;

in the step Z4, the precision cold-rolling adopts a multi-roller cold-rolling mill; the multi-roller cold-rolling mill comprises multiple rollers (16) each having a hole, and a set of rolling mandrels (17) with tapered surfaces; after cold-drawing, cold-expansion and the heat treatment, the layered composite pipe (103) is placed in the rollers (16), and forms a closed deformation hole with the rolling mandrels (17); the layered composite pipe (103) is plastically deformed in the closed deformation hole while the metal crystal grains of the layered composite pipe (103) are crushed; during rolling, the rollers (16) translate horizontally while rotate oppositely, thereby pushing the layered composite pipe (103) to extend in a longitudinal direction; at extreme positions of the rollers (16), the rolling mandrels (17) rotate for advancing the layered composite pipe (103); a rotation range of the rolling mandrels is 0°-60°, and a pipe advancing volume per each pass is 0-3 mm; after the multi-roller precision cold-rolling, a maximum deformation of the layered composite pipe (103) is 20%, a metal pipe crystal grain size grade is 5-9, a wall thickness tolerance is ≤5%, an external diameter roundness error is 0 mm-0.05 mm, a wall thickness unevenness is ≤5%, and a straightness is ≤0.15 mm/m; a quantity of the rollers (16) in the multi-roller cold-rolling mill is three, four, five or six.

10. The method, as recited in claim 3, wherein in the step Z3, further comprises: transporting the layered composite pipe (103) with the reduced diameter into a heat treatment furnace (15) through a furnace bottom spinning roller bed (152), wherein two flame nozzles (151) are arranged separately at a top layer of the heating treatment furnace (15); an optimal hot working temperature is determined according to a lowest material melting point of the layered composite pipe blank (102); during heating, a difference between an actual temperature and the optimal hot working temperature is ±10° C.;

in the step Z4, the precision cold-rolling adopts a multi-roller cold-rolling mill; the multi-roller cold-rolling mill comprises multiple rollers (16) each having a hole, and a set of rolling mandrels (17) with tapered surfaces; after the cold-drawing, the cold-expansion and the heat treatment, the layered composite pipe (103) is placed in the rollers (16), and forms a closed deformation hole with the rolling mandrels (17); the layered composite pipe (103) is plastically deformed in the closed deformation hole while the metal crystal grains of the layered composite pipe (103) are crushed; during rolling, the rollers (16) translate horizontally while rotate oppositely, thereby pushing the layered composite pipe (103) to extend in a longitudinal direction; at extreme positions of the rollers (16), the rolling mandrels (17) rotate for advancing the layered composite pipe (103); a rotation range of the rolling mandrels is 0°-60°, and a pipe advancing volume per each pass is 0-3 mm; after the multi-roller precision cold-rolling, a maximum deformation of the layered composite pipe (103) is 20%, a metal pipe crystal grain size grade is 5-9, a wall thickness tolerance is ≤5%, an external diameter roundness error is 0 mm-0.05 mm, a wall thickness unevenness is ≤5%, and a straightness is ≤0.15 mm/m; a quantity of the rollers (16) in the multi-roller cold-rolling mill is three, four, five or six.

11. The method, as recited in claim 1, wherein in the step 12, further comprises: soaking the rolled layered composite pipe (103) in an alkaline cleaning solution to clean the internal and external surfaces, thereby removing the oil stains; wherein the layered composite pipe (103) is overturned 3-5 times in the alkaline cleaning solution, a soaking time is 5-10 minutes, and a pH value of the alkaline cleaning solution is 8-10;

in the step 13, further comprises: transporting the degreased layered composite pipe (103) into a bright cleaning furnace (10) through a furnace bottom conveyor belt (1001), wherein four sets of bright furnace nozzles (1002) are divided into an upper layer and a lower layer in the bright cleaning furnace (10), so as to ensure uniform heating of the layered composite pipe (103); the bright cleaning furnace (10) is connected to a hydrogen generating device (1003) which generates hydrogen, and the hydrogen undergoes combustion reaction with oxygen to provide heat energy for the bright cleaning furnace (10);

in the step 14, further comprises: grinding the external surface of the layered composite pipe (103) with a grinding wheel head (1), wherein the grinding wheel grinding head (1) is a fine-grain grinding wheel for polishing the surfaces of the blank pipes, and a grinding thickness is 0.1 mm-5 mm;

in the step 15, further comprises: cleaning the internal and external surfaces of the layered composite pipe (103) with a negative pressure cleaning device (11), thereby removing the surface grinding head grit and the metal burrs;

in the step 16, further comprises: performing the ultrasonic detecting on the cleaned layered composite pipe (103) with an ultrasonic detection device (12), so as to comprehensively obtain the metallurgical bonding information of the internal and external surfaces between the adjacent pipe layers of the layered composite pipe;

in the step 17, further comprises: performing the ultrasonic detecting on the surfaces of the cleaned layered composite pipe (103) with an eddy current flaw detection device (13), so as to comprehensively obtain the crack defect information of the layered composite pipe (103) after deformation;

in the step 18, further comprises: sampling and testing the cleaned layered composite pipe (103) through physical testing and chemical testing; analyzing the mechanical properties, the grain sizes, and the corrosion resistances of each pipe layer, and comprehensively evaluating the metal pipe performance.

\* \* \* \* \*